April 25, 1933.　　　T. H. THOMAS　　　1,905,253
SAFETY CAR EQUIPMENT
Filed Jan. 2, 1930　　　2 Sheets-Sheet 2

INVENTOR
THOMAS H. THOMAS (DEC'D)
MABEL M. THOMAS, EXECUTRIX
BY Wm. M. Cady
ATTORNEY Patented Apr. 25, 1933

1,905,253

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed January 2, 1930. Serial No. 417,885.

This invention relates to fluid pressure brake and door controlling apparatus, and more particularly to a safety car control equipment.

The principal object of the invention is to provide an improved safety car control equipment.

Another object of the invention is to provide a novel mechanism for controlling the operation of the brake valve device.

A further object of the invention is to provide a safety car control equipment having novel means for effecting an application of the brakes in case the door controlling valve device is operated to any door open position while the car is in motion and for preventing the release of the brakes until the door controlling valve device is operated to door closed position.

Other objects and advantages will appear in the following more detailed description of the invention.

In the accompanying drawings.

As shown in the accompanying drawings, the safety car control equipment is of the double end type, and at each end of the car, may comprise a foot controlled brake valve device 1, a foot controlled door controlling valve device 2, a door engine 3 and a circuit breaker device 4. The equipment may also comprise an emergency valve device 5, a brake cylinder 6, a main reservoir 7 and double check valve devices 8 and 9 interposed in the straight air pipe 10 and emergency pipe 11 respectively.

Figures 1, 2, 3, 4, 5, 6, 7, 8:
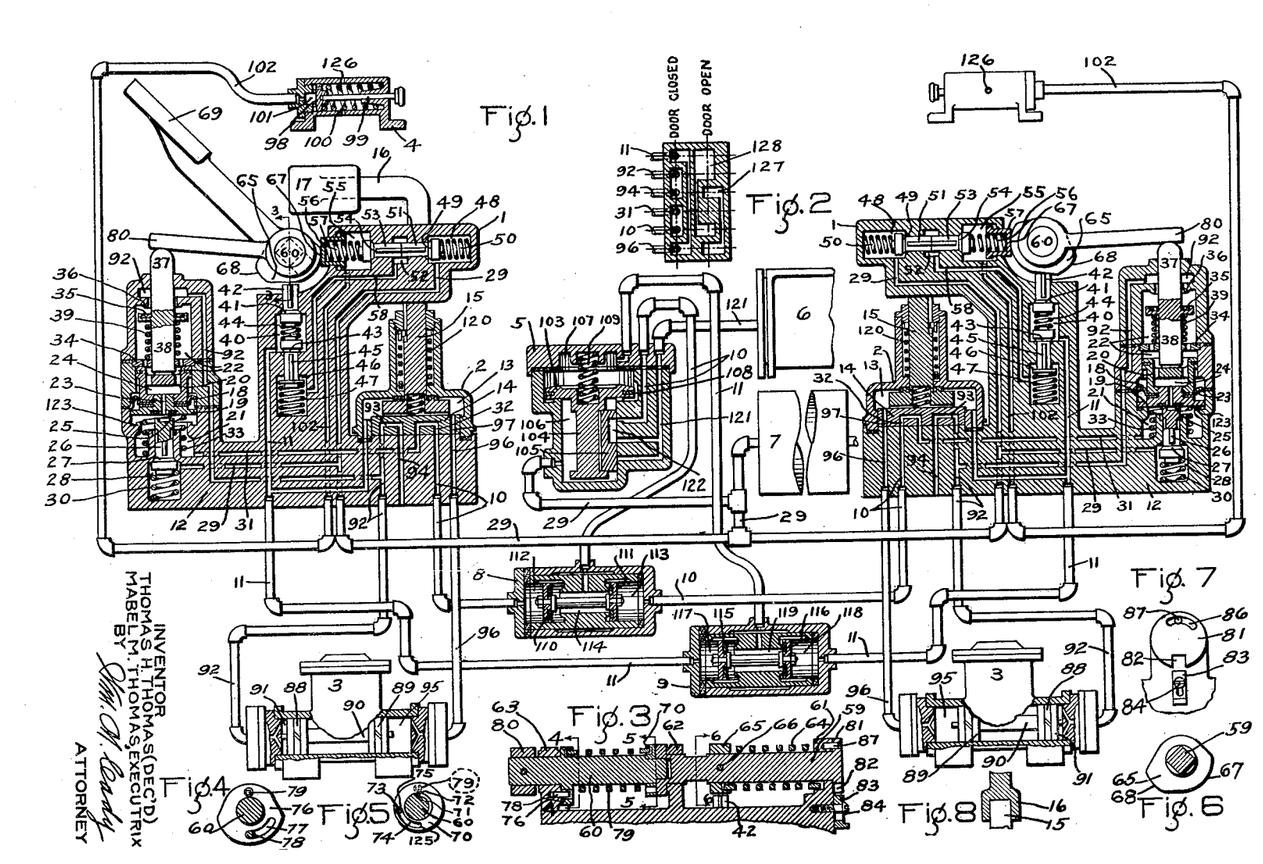
Fig. 1 is a diagrammatic view, partly in section, of a safety car control equipment embodying the invention.
Fig. 2 is a development view of the door controlling valve device.
Fig. 3 is a sectional view taken on the line 3—3 of Fig. 1.
Figs. 4, 5 and 6 are cross sectional views taken on the lines 4—4, 5—5 and 6—6 respectively, of Fig. 3.
Fig. 7 is an end elevational view of a portion of the mechanism for controlling the operation of the brake valve device.
Fig. 8 is a sectional view showing the door controlling heel pedal mounted on the stem of the door controlling rotary valve.
Figures 9, 10, 11:
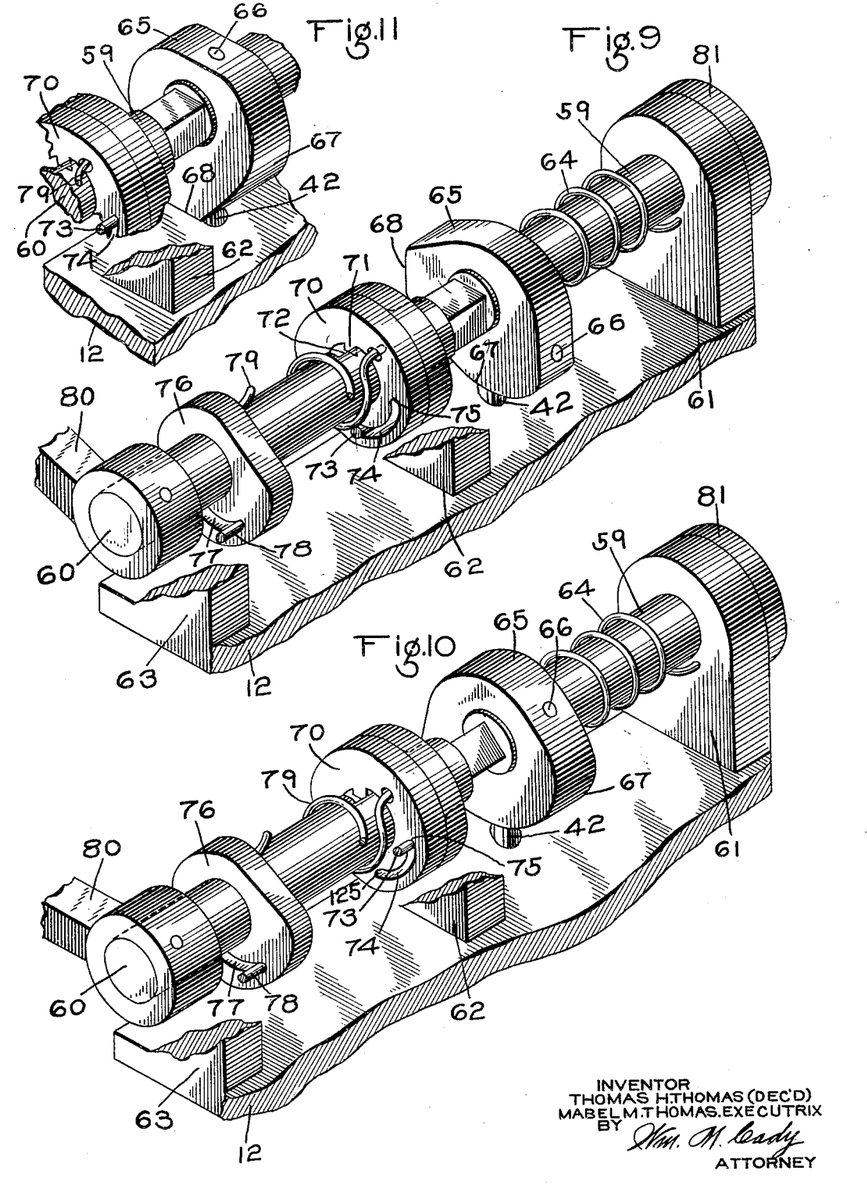
Fig. 9 is an enlarged isometric view of the brake valve operating mechanism in foot off emergency position.
Fig. 10 is a similar view, showing the mechanism in running and release position, the operating pedal being omitted from these two latter views to render the showing of the mechanism more clear.
Fig. 11 is a fragmentary isometric view showing the mechanism in emergency position.

The brake valve device 1 and door controlling valve device 2 at each end of the car are preferably arranged close together and, as shown in Fig. 1 of the drawings, may be combined in a single casing 12.

Contained in a chamber 13 in the casing 12 is a door controlling rotary valve 14 having an operating stem 15 which, in the present embodiment of the invention, is disposed vertically and which is adapted to be operated through the medium of a foot lever 16 removably mounted on the stem, said lever having a heel pad 17 which is arranged to be engaged by the side of an operator's heel.

Secured in the casing 12 is a flexible diaphragm 18 having follower members 19 and 20 engaging opposite sides of the diaphragm. The follower member 19 is contained in a chamber 21 and is provided with a centrally arranged projection which extends upwardly through a central opening in the diaphragm 18 and which has screw-threaded connection with the follower member 20 contained in a chamber 22. These follower members 19 and 20 are provided with constantly connected passages 23 and 24 respectively through which the chambers 21 and 22 are adapted to be connected.

The underside of the follower member 19 is adapted to seal against a seat ring 25 formed on the upper end of the fluted stem 26 of an application valve 27 contained in a chamber 28 which is constantly connected to the main reservoir 7 through a main reservoir passage and pipe 29. There is also contained in the chamber 28 a spring 30, the pressure of which tends to seat the application valve 27.

With the door controlling valve device 2 in door closed position, the chamber 21 is connected to the straight air passage and pipe 10 through a passage 31 and a cavity 32 in the door controlling rotary valve 14.

Also contained in the chamber 21 is a spring 33, the pressure of which tends to maintain the diaphragm 18 and the connected follower members in their uppermost positions as shown in Fig. 1, the follower member 20 being adapted to engage a wall 34 in the casing to limit the upward movement of the diaphragm and followers.

Contained in the chamber 22, is a release valve 35 which is adapted to seal against a seat ring 36 formed on the casing. This valve has an upwardly extending stem 37 which extends through and beyond a portion of the casing and also has a downwardly depending stem 38 which extends through the wall 34 and is adapted to operatively engage the upper portion of the follower member 20.

Also contained in the chamber 22 and interposed between and engaging the under side of the valve 35 and the upper surface of the wall 34 is a spring 39, the pressure of which tends to seat the release valve, the valve stems 37 and 38 being slidably mounted in the casing 12 and wall 34 respectively.

Contained in a chamber 40 which is constantly connected to the emergency passage and pipe 11 is an emergency vent valve 41 having fluted stem 42 which extends through and beyond a portion of the casing and a supply valve 43. Interposed between and engaging these valves, is a spring 44. The valve 43 has a fluted stem 45 which extends into a chamber 46 and is subject to the pressure of a spring 47 contained in this chamber.

Contained in a chamber 48 which is constantly connected to the main reservoir passage 29 is a supply valve 49 which is subject to the pressure of a spring 50. The valve 49 is provided with a fluted stem 51, the end of which extends into a chamber 52 and there engages the end of the fluted stem 53 of a circuit breaker control valve 54 which is contained in a chamber 55 and is subject to the pressure of a spring 56 which is adapted to be varied through the operation of a plunger 57 slidably mounted in the casing. The outer end of the plunger extends through and beyond a portion of the casing.

The chamber 52, which is intermediate the valve chambers 48 and 55, is constantly connected to the chamber 46 through a passage 58.

For the purpose of operating the brake valve device, there is provided a mechanism which comprises shafts 59 and 60, the shaft 59 being rotatably mounted in bearing lugs 61 and 62 carried by the casing and the shaft 60 being rotatably mounted at one end in a bearing lug 63 and at the other end being rotatably mounted in the adjacent end of the shaft 59.

Surrounding the shaft 59 is a torsion spring 64 having one of its ends anchored to the lug 61 and its opposite end anchored to a cam 65 which is secured, intermediate the lugs 61 and 62, to the shaft by a pin 66, which cam has a surface 67 adapted to operatively engage the outer end of the plunger 57 and a surface 68 adapted to operatively engage the outer end of the fluted stem 42 of the emergency valve 41.

Intermediate the cam 65 and the lug 62, the shaft 59 is made square in cross section and, on this part of the shaft, a foot pedal 69 is removably mounted, through the medium of which the operation of the shaft is controlled.

Adjacent the inner end of the shaft 59, there is a collar 70 loosely mounted on the shaft 60 so as to permit a limited rotation of the collar relative to the shaft. This collar is provided with a clutch toe 71 which is adapted to engage a clutch shoulder 72 formed on the shaft 60.

Anchored to the shaft 59 and projecting beyond the inner end thereof, is a projection or pin 73 which extends into an arcuate slot 74, formed in the collar 70, said pin being adapted to engage the collar at the end of the slot indicated by the reference character 75, to drive the collar after the shaft has been rotated a predetermined distance.

The shaft 60 is provided with a collar 76 which may be integral with the shaft and is provided with an arcuate slot 77 into which a pin 78 anchored in the bearing lug 63 extends, said pin being adapted to engage the collar to limit the rotation of the shaft 60.

Surrounding the shaft 60 is a torsion spring 79 having one of its ends anchored to the collar 70 and its other end anchored in the collar 76, through which spring rotary movement is transmitted from the collar 70 to the shaft 60.

Secured to the shaft 60, adjacent its outer end, is an arm 80 which is adapted to operatively engage the end of the release valve stem 37.

The outer end of the shaft 59 is provided with a collar 81 which is provided with a notch 82 which is adapted to receive a locking member 83 which is adapted to be held in locking engagement with the collar by a screw 84 mounted in the casing. The member 83 is provided with a slot 85 which provides for the movement of the locking member into and out of engagement with the collar 81. The collar 81 is also provided with an arcuate slot 86 into which a pin 87, anchored to the bearing lug 61, extends, said pin being adapted to be engaged by the collar 81 at either end of the slot to limit the rotation of the shaft 59.

Each of the door engines 3 may be of the usual type having a casing containing a door opening piston 88 and a door closing piston 89, which pistons are connected together by a bar 90 which is operatively connected with the usual door operating mechanism (not shown).

With the door controlling valve device 2 in door closed position, the door opening piston chamber 91 is connected to the atmosphere through a pipe and passage 92, a cavity 93 in the rotary valve 14, and a passage 94 and the door closing piston chamber 95 is connected to the rotary valve chamber 13 in the door controlling valve device through a pipe and passage 96 and a port 97 in the rotary valve 14.

Each of the circuit breaker devices 4 may be of the usual type and may comprise a casing containing a piston 98 having a stem 99 extending through the casing and being adapted to operate a line switch (not shown) for opening the car motor circuit. On one side, the piston 98 is subject to the pressure of a spring 100. The chamber 101 at one side of the piston is constantly connected to the valve chamber 55 in the brake valve device through a pipe and passage 102.

The emergency valve device 5 may comprise a casing containing a piston 103 having a stem 104 which is adapted to operate a slide valve 105 contained in a chamber 106 which is connected to a chamber 107 at the other side of the piston through a feed groove 108, the chamber 107 being constantly connected to the emergency pipe 11. The piston 103 is subject to the pressure of a spring 109 contained in the chamber 107.

The double check valve device 8 may comprise a casing containing connected check valves 110 and 111, the chamber 112 at one side of the check valve 110 being connected to the straight air pipe 10 at the operating end of the car and the chamber 113 at one side of the check valve 112 being connected to the straight air pipe 10 at the other end of the car, the chamber 114, intermediate the check valves being connected to that portion of the straight air pipe which leads to the seat of the emergency slide valve 105.

The double check valve device 9 may be of the same construction as the check valve device 8 and may comprise a casing containing connected check valves 115 and 116, the chamber 117 at one side of the check valve 115 being connected to the emergency pipe 11 at the operating end of the car and the chamber 118 at one side of the check valve 116 being connected to the emergency pipe 11 at the other end of the car, the chamber 119, intermediate the check valves, being connected to that portion of the emergency pipe 11 which leads to the emergency piston chamber 107.

In operation, the brake valve device 1, at the non-operating end of the car, is locked in service position by the engagement of the collar 81, on the operating shaft 59, with the locking member 83, in which position the application valve 27 is maintained unseated, opening communication from the valve chamber 28 to the chamber 21. Further, with this brake valve device in service position, the spring 56 through the medium of the plunger 57 and cam surface 67, is maintained compressed so that the pressure thereof is sufficient to maintain the valve 54 seated and the valve 49 unseated against the pressure of the spring 50. Still further, with the brake valve device in service position, the emergency valve 41 is maintained seated by the pressure of the spring 44 and the supply valve 43 is maintained unseated against the pressure of the spring 44 by the pressure of the spring 47.

With both of the door controlling valve devices held in door closed positions by the power of torsion springs 120, the operator, in preparing to operate the car, maintains sufficient pressure on the foot pedal 69 to maintain the brake valve device 1 at the operating end of the car in running and release position, as shown at the left hand end of Fig. 1, in which position the emergency and safety control valves 41 and 54 respectively, will be maintained closed and the supply valves 43 and 49 will be maintained unseated, all in the same manner as described in connection with the corresponding valves of the brake valve device at the non-operating end of the car.

Assuming the double check valve device 9, which is interposed in the emergency pipe 11, to be in the position shown in Fig. 1, fluid under pressure supplied to the main reservoir 7 by the usual compressor (not shown), now flows to the emergency piston chamber 107 through the main reservoir pipe and passage 29, past the unseated valve 49 at the operating end of the car, through chamber 52, passage 58, chamber 46, past the unseated valve 43, through valve chamber 40, emergency passage and pipe 11, chamber 117 in the double check valve device 9, past the unseated check valve 115, through chamber 119 and emergency pipe 11 leading to the emergency piston chamber 107.

Fluid under pressure is also supplied from the main reservoir pipe 29 to the emergency valve chamber 106, and since the pressures on both sides of the emergency piston 103 will be substantially equal, the pressure of the spring 109 maintains the emergency valve device in its release position as shown in Fig. 1.

Should the check valve 115 of the double check valve device 9 be seated and the check valve 116 be unseated, the emergency piston chamber will be supplied with fluid under pressure from the main reservoir 7 by way of the brake valve device 1 at the non-operating end of the car, until such time as the emergency pipe 11 is connected to the atmosphere through the brake valve device at the operating end of the car to effect an emergency application of the brakes, when the pressure of fluid in the check valve chamber 118 causes the check valve 116 to seat and the check valve 115 to unseat, thus connecting the emergency piston chamber 107 to the atmosphere, insuring an emergency application of the brakes.

When the brake valve device 1 at the operating end of the car is in running and release position, the torsion spring 79 has been wound up sufficiently that the power thereof, acting through the medium of the shaft 60 and arm 80, is sufficient to maintain the release valve 35 unseated from its seat ring 36, against the pressure of the spring 39 and to cause the lower end of the release valve stem to engage the follower member 19, but is insufficient to cause downward movement of the follower member against the pressure of the spring 33. Since the power of the spring 79 is not sufficient to overcome the opposing pressure of the spring 33, communication from the chamber 21 to the chamber 22 is maintained through the passages 23 and 24 in the follower members 19 and 20 respectively, thus connecting the valve chamber 112 in the double check valve device 8 to the atmosphere by way of pipe and passage 10, cavity 32 in the door controlling rotary valve 14, passage 31, chamber 21 in the brake valve device, passages 23 and 24 in the follower members 19 and 20 respectively, chamber 22, past the unseated release valve 35, passage 92, cavity 93 in the door controlling rotary valve 14 and passage 94.

Since the application valve 27 of the brake valve device at the non-operating end of the car is maintained unseated, fluid under pressure from the application valve chamber 28, supplied from the main reservoir 7, flows to the valve chamber 113 in the double check valve device 8, past the unseated application valve 27, chamber 21, passage 31, cavity 32 in the door controlling rotary valve 14 at the non-operating end of the car, and passage and pipe 10. With the check valve chamber 112 vented as described, the pressure of fluid in the check valve chamber 113 maintains the check valve 111 seated, and the check valve 110 unseated. With the check valve 110 thus maintained unseated, and the emergency valve device 5 in release position, the brake cylinder 6 is connected to the check valve chamber 112 by way of a pipe and passage 121, a cavity 122 in the emergency slide valve 105, straight air passage and pipe 10, chamber 114 in the double check valve device 8 and past the unseated valve 110, thus connecting the brake cylinder to the atmosphere.

With the equipment thus fully charged and the brake valve device 1 at the operating end of the car maintained in running and release position by the power of the torsion spring 79, as governed by the operator's foot pressure on the foot pedal 69, and it is desired to effect a service application of the brakes, the operator, by increasing his foot pressure on the foot pedal 69, causes the shaft 59 to be rotated in an anti-clockwise direction and such movement is imparted to the collar 70 through the direct engagement of the pin 73 with the collar at the end 75 of the arcuate slot 73, causing the further winding up of the torsion spring 79 and thus increasing the power of the spring tending to rotate the shaft 60 in an anti-clockwise direction.

Now, when the power of the torsion spring 79 has been increased sufficiently to overcome the opposing pressures of the springs 39 and 33, the shaft 60 and arm 80 secured thereto, are caused to rotate in an anti-clockwise direction. Since the arm 80 is in engagement with the stem 37 of the release valve and the stem 38 is in engagement with the follower member 20, the followers 19 and 20 will be forced downwardly to their extreme lower positions, in which the communication from the brake cylinder to the atmosphere is closed off and the application valve 27 is unseated against the pressure of the spring 30.

With the application valve 27 thus unseated, fluid under pressure from the valve chamber 28, supplied from the main reservoir 7, flows to the brake cylinder 6, past the unseated application valve 27, through chamber 21, passage 31, cavity 32 in the door controlling rotary valve 14, the straight air passage and pipe 10 at the operating end of the car, check valve chamber 112, past the unseated check valve 110, through chamber 114 in the check valve device 8, straight air pipe and passage 10 leading to the emergency valve device 5, cavity 122 in the emergency slide valve 105 and passage and pipe 121. Now, if the operator exerts sufficient foot pressure on the foot pedal 69 to maintain the application valve 27 unseated, a full service application of the brakes will be effected.

Should the operator desire to limit the brake application, he may exert sufficient pressure on the foot pedal 69 to cause the application valve to be unseated, but not sufficient to cause the valve to remain unseated to effect a full service application. Now, when the brake cylinder pressure, present in the chamber 21, together with the pressure of the springs 30 and 33 acting on the underside of the follower 19 and diaphragm 18 are sufficient to overcome the pressure power of the torsion spring 79 as adjusted by the operator's foot pressure on the foot pedal 69, the diaphragm is flexed upwardly permitting the pressure of the spring 30 to seat the application valve 27 to close off the further supply of fluid under pressure to the chamber 21 and the brake cylinder.

During the upward movement of the diaphragm 18 and the application valve 27, an air tight seal is maintained between the follower member 19 and its seat ring 25 on the application valve stem 26, so that the brake cylinder pressure will not be permitted to reduce to the atmosphere by way of the passage 23 in the follower 19. When the application valve 27 is thus seated, the flow of fluid from the valve chamber 28 to the chamber 21 is closed off, so that the upward movement of the follower 19 will come to a stop and maintain the atmospheric communication closed, thus maintaining the brake cylinder pressure until such time as the operator's foot pressure on the foot pedal 69 is increased or decreased.

To release the brakes, the operator relieves the foot pedal 69 of some of his foot pressure, and as he does this, the power of the torsion spring 64 causes the shaft 59 to rotate in a clockwise direction, carrying with it the pin 73. As the pin 73 is thus moved, the power of the torsion spring 79 causes the collar 70 to rotate in the same direction as the shaft 59 is rotating, the power of the spring 79 maintaining the collar in engagement with the pin 73.

In rotating the collar 70, the torsion spring 79 unwinds and its power, tending to rotate the shaft 60 in an anti-clockwise direction, is decreased.

As the power of the spring 79 is being decreased, the pressure of fluid in the chamber 21 acting on the underside of the diaphragm 18 and the pressure of the spring 33 acting on the underside of the diaphragm 18 through the medium of the follower member 19, together with the pressure of the spring 39 acting on the release valve 35, causes the diaphragm 18 to flex upwardly, unseating the follower member from its seat ring 25 against the pressure of the arm 80. When the pedal 69 is in running and release position, the follower member 20 stops against the wall 34 of the casing and the power of the spring 79, as transmitted through the shaft 60 and arm 80, will be sufficient to maintain the release valve 35 unseated from its seat ring 36 against the upward pressure of the spring 39.

With the follower member 19 thus unseated from its seat ring 25 and the release valve 35 maintained unseated from its seat ring 36, fluid under pressure is released from the brake cylinder 6 by way of pipe and passage 121, cavity 122 in the emergency slide valve 105, straight air passage and pipe 10, chamber 114 in the double check valve device 8, past the unseated check valve 110 into chamber 112 and from thence through the straight air pipe and passage 10 at the operating end of the car, cavity 32 in the door controlling rotary valve 14, passage 31, chamber 21, passages 23 and 24 in the follower members 19 and 20 respectively, chamber 22, past the unseated release valve 35, through passage 92, cavity 93 in the door controlling rotary valve 14 and passage 94.

If, after a service application of the brakes has been effected, it is desired to effect the gradual release of the brakes, the operator reduces foot pressure on the foot pedal 69 any desired amount, permitting the power of the torsion spring 79 to reduce correspondingly. When the power of the spring 79 reduces, the follower member 19 will be caused to unseat from its seat ring 25 and permit fluid under pressure from the brake cylinder to flow to the atmosphere in the same manner as has been described in connection with the full release of the brakes. Now, when the brake cylinder pressure present in chamber 21, has been reduced to such an extent that the upward pressure on the underside of the diaphragm 18 is less than the downward reduced pressure of the torsion spring 79 on the upper side of the diaphragm as transmitted through the shaft 60, arm 80 and release valve stems 37 and 38, the pressure of the spring causes the diaphragm to flex downwardly and again seal against the seat ring 25 and close off the further flow of fluid from the brake cylinder to the atmosphere.

It will here be noted that the operator may easily graduate the application and release of the brakes by varying the power of the torsion spring 79 through the operation of the foot pedal 69.

If the operator desires to effect an emergency application of the brakes, he presses the foot pedal 69 to its extreme forward position, rotating the shaft 59 and cam 65 secured thereto so that the cam surface 68 engages the upper end of the emergency valve stem 42 and forces it downwardly, unseating the emergency valve 41 against the pressure of the spring 44. As the valve 41 is being unseated, the pressure of the spring 44 on the supply valve 43 is increased, causing the valve 43 to be seated against the pressure of the spring 47, closing off the supply of fluid under pressure from the main reservoir to the emergency pipe.

With the emergency valve 41 unseated, fluid under pressure flows from the emergency piston chamber 107 through the emergency pipe 11, chamber 119 in the double check valve device 9, past the unseated check valve 115, through check valve chamber 117, emergency pipe and passage 11 at the operating end of the car, valve chamber 40 and past the unseated emergency valve 41. If the check valve 115 should be seated and the check valve 116 unseated, when an emergency application is initiated, the pressure of fluid in the check valve chamber 118 will cause the check valve 116 to seat and the check valve 115 to unseat, thus ensuring the venting of fluid under pressure from the emergency piston chamber.

With the emergency piston chamber 107 thus vented, the pressure of fluid in the emergency valve chamber 106 causes the emergency piston to operate to its extreme outer position against the pressure of the spring 109, carrying with it the slide valve 105. With the slide valve 105 in emergency position, fluid under pressure is supplied from the main reservoir 7 to the brake cylinder through the main reservoir pipe 29, emergency valve chamber 106, past the end of the emergency slide valve 105 and through passage and pipe 121.

As the shaft 59 is being rotated to emergency position, the shaft 60 is rotated through the medium of the pin 73, collar 70 and torsion spring 79, until such time as the follower member 19 stops against a shoulder 123 formed on the casing, which stops the rotation of the shaft 60. Further rotation of the shaft 59 to emergency position being permitted by the spring and collar connection from the shaft 59 to the shaft 60.

In effecting such an emergency application of the brakes, the door at the operating end of the car will be balanced, since the door closing piston chamber of the door engine will be vented to the atmosphere by way of pipe and passage 96, port 32 in the door controlling rotary valve 14, rotary valve chamber 13, passage 11, valve chamber 40 and past the unseated emergency valve 41.

To release such an emergency application of the brakes, the operator, by relief of sufficient foot pressure on the foot pedal 69, permits the brake valve device to operate to running and release position, in which the emergency valve 41 is seated and the emergency pipe supply valve 43 is unseated.

With the valve 43 unseated, fluid under pressure from the main reservoir is again supplied to the emergency piston chamber 107, causing the emergency piston 103 to operate to its extreme inner position, in which the brake cylinder passage 121 is connected to the straight air passage 10 through the cavity 122 in the emergency slide valve. Fluid under pressure is now discharged to the atmosphere in the same manner as described in connection with the release of the brakes after a service application.

Fluid under pressure supplied to the emergency passage 11 also flows to the door closing piston chamber 95 in the door engine and maintains the door closed.

Should the operator be incapacitated, or for any other reason remove his foot from the foot pedal 69, an emergency application of the brakes will be automatically effected in the following manner:

Assuming the brake valve device 1 to be in running and release position, and the foot pedal 69 is relieved of the operator's foot pressure, the power of the torsion spring 64 rotates the shaft 59 in a clockwise direction. As the shaft 59 is thus rotated, the power of the torsion spring 79 rotates the collar 70 in a clockwise direction until such rotation is stopped by the engagement of the clutch toe 71 with the clutch shoulder 72 on the shaft 60, at which time the pressure of the spring 39 causes the release valve 35 to move upwardly and seal against the seat ring 36, closing off the atmospheric connection from the straight air pipe 10.

At substantially the same time as the clutch toe 71 engages the clutch shoulder 72, the rotation of the shaft 60 is stopped by the collar 76 engaging the pin or stop 78.

After the rotation of the shaft 60 and collar 70 has been stopped, the shaft 59 will continue to rotate relative thereto, until the cam 65, secured to the shaft 59, has been operated a sufficient distance that the cam surface 67 will be out of engagement with the plunger 57. The movement of the shaft 59 relative to the collar 70 being rendered possible by the slot and pin connection between the shaft and collar.

When the cam surface 67 is free of the plunger 57, the pin 73 engages the collar 70 at the end 125 of the slot 74 and the collar 81 engages the pin 87, thus limiting the clockwise rotation of the shaft 59.

When the cam surface 67 has been moved free of the plunger 57, the spring 56 expands, moving the plunger outwardly, decreasing the pressure of the spring on the valve 54 to such an extent that the pressure of the spring 50 causes the supply valve 49 to seat and the safety control valve 54 to unseat against the pressure of the spring 56.

With the valve 49 seated, the supply of fluid under pressure to the emergency pipe is closed off and with the safety control valve 54 unseated, fluid under pressure from the emergency piston chamber 107 flows to the piston chamber 101 in the circuit breaker device 4 at the operating end of the car, by way of emergency pipe and passage 11, past the unseated valve 43, through chamber 46, passage 58, chamber 52, past the unseated safety control valve 54, chamber 55 and passage and pipe 102. The pressure of fluid thus supplied to the piston chamber 101 causes the circuit breaker piston 98 and its stem 99 to move outwardly against the pressure of the spring 100, operating the usual line switch (not shown) to open the car motor circuit.

Now, when the piston 98 has been moved beyond ports 126, fluid under pressure in the chamber 98 is discharged to the atmosphere through these ports, thus venting the emergency piston chamber 107, permitting the emergency valve device to operate to emergency position to supply fluid under pressure to the brake cylinder.

Since the door closing piston chamber 95 of the door engine is connected to the emergency passage in the brake valve device at the operating end of the car, fluid under pressure is vented therefrom by way of the circuit breaker device, thus balancing the car door.

To release such an emergency application of the brakes, the foot pedal is pressed forward to running and release position, rotating the shaft 59 in an anti-clockwise direction, causing the cam surface 67 of the cam 65 to engage and force the plunger 57 inwardly, compressing the spring 56 sufficiently that the pressure thereof causes the safety control valve 54 to seat and the supply valve 49 to unseat.

With the valve 49 thus unseated, fluid under pressure is again supplied to the emergency piston chamber 107, causing the emergency valve device to operate to release position.

When the brake valve device is in running and release position, the power of the torsion spring acting through the shaft 60 and arm 80 maintains the release valve 35 unseated so that when the emergency valve device operates to release position, fluid under pressure is vented to the atmosphere in the same manner as before described to release the brakes.

The foot pedal 69 and heel pad 17 are so positioned that they may be engaged by the ball and side of the heel respectively of one foot of an operator, for normally controlling the brakes and the car door.

Should the brake valve device be in service position and the operator desire to open the car door, he maintains the foot pedal 69 in service position by pressure through the ball of his foot and by a sidewise rotation of his heel, with the ball of his foot as a center, rotates the lever 16 operating the rotary valve 14 to door open position, in which fluid under pressure in the door closing piston chamber 95 is discharged to the atmosphere through pipe and passage 96, a cavity 127 in the rotary valve 14 and passage 94. With the rotary valve 14 in this position, fluid under pressure in the rotary valve chamber, as supplied from the main reservoir through the emergency pipe, flows to the door opening piston chamber 91 in the door engine, by way of a port 128 in the rotary valve 14 and passage and pipe 92, causing the door opening piston to operate to open the door.

From the port 128, fluid under pressure flows to the brake cylinder through the straight air pipe and passage 10, so that if the brake valve device should be permitted to operate to running and release position while the door is open, the brakes cannot be released.

It will also be noted that if the door controlling valve device is operated to door open position while the car is running, an application of the brakes will be effected regardless of the position of the brake valve device.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid pressure brake, the combination with a brake valve device comprising a valve mechanism operative to normally control the application and release of the brakes and valve means operative to initiate an emergency application of the brakes, of a plurality of rotatable shafts operative to control the operation of said valve mechanism and valve means, means for rotating one of said shafts, and resilient means operatively connecting said shafts, said resilient means rendering said brake valve device self-lapping.

2. In a fluid pressure brake the combination with a brake valve device comprising a valve mechanism operative to normally control the application and release of the brakes and valve means operative to initiate an emergency application of the brakes, of a driving shaft and a driven shaft for controlling the operation of said valve mechanism and valve means, and resilient means for transmitting driving power from said driving shaft to said driven shaft and for rendering said brake valve device self-lapping.

3. In a fluid pressure brake, the combination with a brake valve device comprising a valve mechanism operative to normally control the application and release of the brakes and valve means operative to initiate an emergency application of the brakes, of a plurality of relatively rotatable shafts for controlling the operation of said valve mechanism and valve means, and a torsion spring operatively connecting said shafts, said spring rendering said brake valve device self-lapping.

4. In a fluid pressure brake, the combination with a brake valve device comprising a valve mechanism operative to normally control the application and release of the brakes and valve means operative to initiate an emergency application of the brakes, of an arm operative to control the operation of said valve mechanism, a rotatable shaft for operating said arm, a cam operative to control the operation of said valve means, a rotatable shaft for operating said cam and resilient means for transmitting power from the second mentioned shaft to the first mentioned shaft to control the operation of the valve mechanism and for permitting the rotation of the second mentioned shaft relative to the first mentioned shaft for controlling the operation of said valve means.

5. In a fluid pressure brake, the combination with a brake valve device comprising a valve mechanism operative to normally control the application and release of the brakes and valve means operative to initiate an emergency application of the brakes, of an arm operative to control the operation of said valve mechanism, a rotatable shaft for operating said arm, means for stopping the rotation of said shaft, a cam operative to control the operation of said valve means, a rotatable shaft for operating said cam, resilient means interposed between and cooperating with both of said shafts for transmitting power from the second mentioned shaft to the first mentioned shaft and for permitting rotation of the second mentioned shaft after the first mentioned shaft has been stopped for controlling the operation of said valve means.

6. In a fluid pressure brake, the combination with a brake valve device comprising a valve mechanism operative to normally control the application and release of the brakes and valve means operative to initiate an emergency application of the brakes, of an arm for controlling the operation of said valve mechanism, a torsion spring for controlling the operation of said arm, a shaft rotatable to vary the power of said spring and for controlling the operation of said valve mechanism, and means for controlling the operation of said shaft.

7. In a fluid pressure brake, the combination with a brake valve device comprising a valve mechanism operative to normally control the application and release of the brakes and valve means operative to initiate an emergency application of the brakes, of an arm for controlling the operation of said valve mechanism, a torsion spring for controlling the operation of said arm, a shaft rotatable to vary the power of said spring and for controlling the operation of said valve mechanism, a pedal for rotating said shaft in a direction to increase the power of said spring and to operate said valve means, and a spring for rotating said shaft in the opposite direction.

8. In a fluid pressure brake, the combination with a brake valve device comprising a valve mechanism operative to normally control the application and release of the brakes and valve means operative to initiate an emergency application of the brakes, of an arm for controlling the operation of said valve mechanism, a torsion spring for controlling the operation of said arm, a shaft rotatable over a predetermined zone to vary the power of said spring and rotatable beyond one limit of said zone for controlling the operation of said valve means, and means for controlling the rotation of said shaft.

9. In a fluid pressure brake, the combination with a brake valve device comprising a valve mechanism operative to normally control the application and release of the brakes, an emergency valve operative to effect an emergency application of the brakes and a safety control valve operative to effect an emergency application of the brakes, of an arm for controlling the operation of said valve mechanism, a spring for controlling the operation of said arm, a shaft rotatable over a predetermined zone for varying the power of said spring, rotatable beyond one limit of said zone for controlling the operation of said emergency valve and rotatable beyond the other limit of said zone for controlling the operation of said safety control valve.

10. In a fluid pressure brake, the combination with a brake valve device comprising a valve mechanism operative to normally control the application and release of the brakes, an emergency valve operative to effect an emergency application of the brakes and a safety control valve operative to effect an emergency application of the brakes, of an arm for controlling the operation of said valve mechanism, a spring for controlling the operation of said arm, a shaft rotatable by manual power over a predetermined zone for increasing the power of said spring to effect an application of the brakes and rotatable by manual power beyond one limit of said zone for causing said emergency valve to be operated to effect an emergency application of the brakes, and means for rotating said shaft beyond the other limit of said zone, when said shaft is relieved of manual power, for causing the safety control valve to be operated to effect an emergency application of the brakes.

11. In a fluid pressure brake, the combination with a brake valve device comprising a valve mechanism operative to normally control the application and release of the brakes, of a rotatable arm for controlling the operation of said valve mechanism, a spring for controlling the rotation of said arm, and a rotatable shaft for varying the power of said spring.

12. In a fluid pressure brake, the combination with a brake valve device comprising a valve mechanism operative to normally control the application and release of the brakes, of an arm for controlling the operation of said valve mechanism, a rotatable shaft for operating said arm, a spring for rotating said shaft, and another rotatable shaft for varying the power of said spring.

13. In a fluid pressure brake, the combination with a brake valve device comprising a valve mechanism operative to normally control the application and release of the brakes, of an arm for controlling the operation of said valve mechanism, a rotatable shaft for operating said arm, a spring for rotating said shaft and for rendering said brake valve device self-lapping, a member loosely mounted on said shaft and rotatable relative thereto for varying the power of said spring, and another shaft operative to control the operation of said member.

14. In a fluid pressure brake, the combination with a brake valve device comprising a valve mechanism operative to normally control the application and release of the brakes, of an arm for controlling the operation of said valve mechanism, a rotatable shaft for operating said arm, a spring for rotating said shaft and for rendering said brake valve device self-lapping, a member loosely mounted on said shaft and rotatable relative thereto for varying the power of said spring, and means subject to the foot pressure of an operator for controlling the operation of said member.

15. In a fluid pressure brake, the combination with a brake valve device comprising a valve mechanism operative to normally control the application and release of the brakes and safety control valve means operative to effect an emergency application of the brakes, of an arm for controlling the operation of said valve mechanism, a rotatable shaft for operating said arm, a resilient element for operating said shaft, a member rotatably mounted on said shaft for varying the power of said element, a cam shaft subject to manual power for holding said member in such a position that the power of said spring maintains said valve mechanism in release position, a cam on said cam shaft, a spring for rotating said shaft and thereby the cam to operate said safety control valve means to initiate an emergency application of the brakes when the cam shaft is relieved of manual pressure, and means on said member adapted to engage the first mentioned shaft, when said cam shaft is rotated by said spring, to render said resilient element ineffective to control the operation of said arm.

16. In a fluid pressure brake, the combination with a brake valve device comprising a valve mechanism operative to normally control the application and release of the brakes and safety control valve means operative to effect an emergency application of the brakes, of an arm for controlling the operation of said valve mechanism, a rotatable shaft for operating said arm, a resilient element for operating said shaft, a member rotatably mounted on said shaft for varying the power of said element, a cam shaft subject to manual power for holding said member in such a position that the power of said spring maintains said valve mechanism in release position, a cam on said cam shaft, a spring for rotating said shaft and thereby the cam to operate said safety control valve means to initiate an emergency application of the brakes when the cam shaft is relieved of manual pressure, a toe on said member adapted to engage the first mentioned shaft, when said cam shaft is rotated by said spring, to render said resilient element ineffective to control the operation of said arm, and a lost motion connection between said cam shaft and member for permitting said cam shaft to be rotated to move said cam out of engagement with said safety control valve means without operating said member.

17. In a fluid pressure brake, the combination with a brake cylinder, of an emergency pipe, a straight air pipe, a brake valve device operative to control the supply and release of fluid under pressure to and from said brake cylinder through said straight air pipe, and a door controlling valve device having a door closing position in which a communication is established through which fluid under pressure supplied and released to and from the brake cylinder flows and having a door opening position in which said communication is closed off and another communication established through which fluid under pressure is supplied from the emergency pipe to the straight air pipe and brake cylinder.

18. In a fluid pressure brake, the combination with a brake cylinder, of a straight air pipe through which fluid under pressure is adapted to be supplied and released to and from the brake cylinder, a door controlling valve device having a position establishing communication through which fluid under pressure is adapted to flow to and from the straight air pipe, and a brake valve device operative to control the supply and release of fluid under pressure to and from the straight air pipe, said door controlling valve device having another position for rendering said brake valve device ineffective to control the supply and release of fluid under pressure to and from the straight air pipe.

19. In a fluid pressure brake, the combination with a brake cylinder, of a straight air pipe through which fluid under pressure is adapted to be supplied and released to and from the brake cylinder, a door controlling valve device having a position establishing communication through which fluid under pressure is adapted to flow to and from the straight air pipe, and a brake valve device operative to control the supply and release of fluid under pressure to and from the straight air pipe, said door controlling valve device having another position for rendering said brake valve device ineffective to control the supply and release of fluid under pressure to and from the straight air pipe and for supplying fluid under pressure to the straight air pipe independently of the brake valve device.

20. In a fluid pressure brake, the combination with a brake cylinder, a straight air pipe through which fluid under pressure is adapted to be supplied and released to and from the brake cylinder, a door controlling valve device having a door closed position for establishing communication through which fluid under pressure supplied and released to and from the straight air pipe is adapted to flow, a brake valve device operative to control the supply and release of fluid to and from the straight air pipe, said door controlling valve device having a door open position for supplying fluid under pressure to the straight air pipe to effect an application of the brakes and for rendering said brake valve device ineffective to control the brakes.

21. In a fluid pressure brake, the combination with a brake cylinder, of a straight air pipe through which fluid under pressure is supplied and released to and from the brake cylinder, an emergency pipe charged with fluid under pressure, a brake valve device operative to supply and release fluid under pressure to and from the straight air pipe, and a door controlling valve device having a door closing position in which communication is established through which fluid under pressure to and from the straight air pipe is controlled by the brake valve device flows and having a door opening position in which said communication is closed off and fluid under pressure is supplied from the emergency pipe to the straight air pipe and brake cylinder to effect an application of the brakes.

22. In a fluid pressure brake, the combination with a brake cylinder, of a straight air pipe through which fluid under pressure is supplied and released to and from the brake cylinder, a brake valve device normally operative to supply and release fluid under pressure to and from the straight air pipe and brake cylinder, a door controlling valve device having a door closed position in which communication through which fluid under pressure supplied and released from the straight air pipe by the brake valve device flows and having a door open position for supplying fluid under pressure to the straight air pipe and for rendering said brake valve device ineffective to release fluid under pressure from the straight air pipe and brake cylinder.

23. In a fluid pressure brake, the combination with a brake cylinder, of a brake valve device operative to effect an application and release of the brakes, of a door controlling valve device having a position for rendering said brake valve device effective to control the brakes and another position for effecting an application of the brakes and for rendering the brake valve device ineffective to control the brakes.

24. In a fluid pressure brake, the combination with a brake cylinder, of a brake valve device operative to effect an application and release of the brakes, of a door controlling valve device having a door closed position for rendering said brake valve device effective to control the brakes and having a door open position for effecting an application of the brakes and for rendering said brake valve device ineffective to release the brakes.

25. In a fluid pressure brake, the combination with a brake valve device comprising a casing, of a flexible diaphragm forming a chamber in said casing, a brake cylinder connected to said chamber, a follower member carried by said diaphragm and having a passage formed therein through which said chamber is normally connected to the atmosphere, a valve device operative to supply fluid under pressure to said chamber and brake cylinder, and a seat ring carried by said valve, said flexible diaphragm being operative to seal said follower member against said seat ring for closing off the communication through said passage from the chamber to the atmosphere and to operate said valve to supply fluid under pressure to said chamber and brake cylinder to effect an application of the brakes.

26. In a fluid pressure brake, the combination with a brake cylinder, of a brake valve device comprising a casing, a flexible diaphragm mounted in and dividing a portion of said casing into two chambers, one of said chambers being normally connected to the atmosphere, and the other being normally connected to the brake cylinder, means carried by said diaphragm normally establishing communication from one of said chambers to the other through which the brake cylinder is connected to the atmosphere, and a valve operative to supply fluid under pressure to one of said chambers and the brake cylinder to effect an application of the brakes, said flexible diaphragm being operative to close the communication through said means and to operate said valve to supply fluid under pressure.

In testimony whereof I have hereunto set my hand.

MABLE M. THOMAS,
*Executrix of the Last Will and Testament of Thomas H. Thomas, Deceased.*